Figure 1:
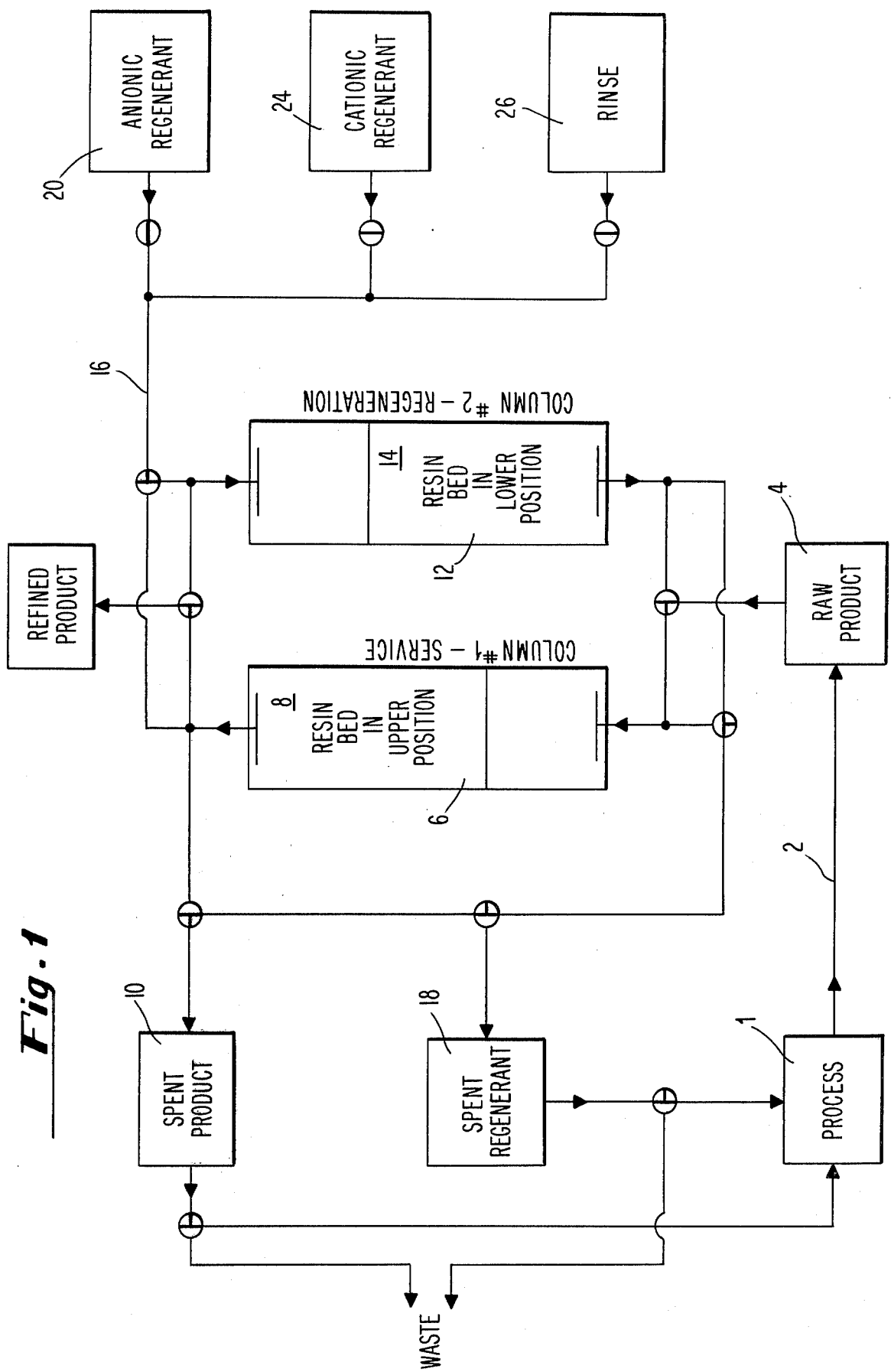

United States Patent [19]

Grier

[11] 4,176,056
[45] Nov. 27, 1979

[54] CYCLIC OPERATION OF A BED OF MIXED ION EXCHANGE RESINS

[75] Inventor: Jesse G. Grier, Gilbertsville, Ky.

[73] Assignee: Pennwalt Corporation, Philadelphia, Pa.

[21] Appl. No.: 900,454

[22] Filed: Apr. 27, 1978

[51] Int. Cl.² .................................................. B01D 15/04
[52] U.S. Cl. ................................... 210/20; 210/30 R; 210/37 B
[58] Field of Search .................... 210/20, 30 R, 32, 33, 210/35, 37 B; 423/54

[56] References Cited

U.S. PATENT DOCUMENTS

| | | | |
|---|---|---|---|
| 2,692,244 | 10/1954 | Kunin et al. | 210/35 |
| 3,458,436 | 7/1969 | Martinola et al. | 210/35 |
| 3,501,401 | 3/1970 | Calmon | 210/33 |
| 3,527,718 | 9/1970 | Coburn | 210/35 |
| 3,664,950 | 5/1972 | Saraceno et al. | 210/37 B |
| 3,980,751 | 9/1976 | Foulkes | 423/54 |
| 4,036,751 | 7/1977 | Orita et al. | 210/37 B |
| 4,057,494 | 11/1977 | Chopra | 210/37 B |

Primary Examiner—Charles N. Hart
Assistant Examiner—Ivars Cintins

[57] ABSTRACT

An advantageous industrial procedure for the removal of ions from an aqueous feed solution is accomplished in a system having a column containing a bed of mixed anion and cation exchange resins wherein the bed is capable of moving upward or downward en masse in the column. The feed solution is passed upward through the column causing the bed to tend to move upward en masse and eventually exhausting the exchange resin. Then, an aqueous stripping solution is passed downward through the bed to remove the ions from the exchange resin and causing the bed to tend to move downward en masse. Thereafter, the exchange resins are regenerated and the procedure is repeated.

10 Claims, 2 Drawing Figures

CYCLIC OPERATION OF A BED OF MIXED ION EXCHANGE RESINS

This invention relates to a process for removing ions from a feed solution wherein said solution is passed upward through a column of a bed of mixed anion and cation exchange resins. The bed is free to move upward or downward in the column and is, under the operating conditions of the exchange step, maintained en masse in a mixed condition.

Ion exchange removal of specific ionic components from aqueous solutions using beds of mixed ion exchange resins is conventional industrial practice. In many instances its purpose is to improve the selectivity or capacity of one exchange resin by means of intimate mixture with a second exchange resin. In other cases, the primary purpose is to improve the stability of the treated solution under the conditions existing for the described exchange. In another type of application, mixtures of exchange resins have been used wherein the two resins act more or less independently with specific solution components and are combined in one bed only as a matter of convenience. When the exchange resin mixture is used in a cyclic manner, means must be provided for regenerating each resin. In general, one of the resins is of an anionic (basic) type and the other is of the cationic (acidic) type. Treatment with an alkaline solution is generally called for to regenerate the former, while treatment with an acidic solution is generally called for with the latter. Therefore, separation of the resins into two layers or removal from the bed for external regeneration, is necessary.

Depending on the specific application, various schemes for carrying out the ion exchange cycle have been devised. Most commonly, the service or exhaustion step, during which the ionic component is removed from the feed solution, is carried out in a downflow of the solution through the bed. A main reason for this is that, at customary flow rates, the bed would tend to be fluidized if the flow was upward. Preferred practice involves following the service step with a counter flow for back flushing. An upward flow of wash liquid allows the removal of entrapped solids by fluidizing the bed. Additional steps may be included in the cycle, such as "sweetening on", while the effluent builds up to the desired quality, "sweetening off", and rinses. In applications where it is desired to recover, or isolate, the adsorbed component, a special step may be required, sometimes called "stripping".

It has been found that in the conventional operation of a mixed ion exchanger bed process for the removal of ions from aqueous feed solutions where the feed solution is passed downward through the bed, certain problems are present. For example, because of the difference between the specific gravities of the exchange resins and a high density feed solution, and additionally where slow flow rates are required for efficient ion removal, the exchange resins in the bed tend to float and the materials separate.

In accordance with this invention, which concerns a cyclic process for the removal of ions from an aqueous feed solution by passing said feed solution through a column containing a bed of mixed anion and cation exchange resins having a specific gravity difference, said difference being no more than 0.2, said bed being capable of moving upward or downward en masse in said column, and thereafter removing said ions from said bed and regenerating said exchange resins, the improvement comprises the steps of:

(a) passing said feed solution upward through said bed at a rate sufficient to tend to move said bed en masse upward whereby ions are removed from said feed solution by adsorption on at least one of said exchange resins;

(b) after terminating the flow of said feed solution through said bed, passing an ion accepting aqueous solution through said bed whereby said ions are at least substantially removed from said bed;

(c) after terminating the flow of said ion accepting aqueous solution through said bed, passing an aqueous regenerating solution through said bed for regenerating the exchange resin which adsorbed said ions; and (d) after terminating the flow of said aqueous regenerating solution, repeating said steps.

The term "capable of moving upward or downward", as used herein to refer to the ion exchange resin bed in the column, designates a bed which is capable of moving upward or downward en masse, depending on its initial position in the column, but which may be restrained from such movement by means of a covering screen, mesh, floating beads or the like.

In a preferred embodiment of this invention, said ion accepting aqueous solution is an alkaline solution while the aqueous regenerating solution is a mineral acid solution.

In a modification of the above described process, after step one and prior to step two, the mixed exchange resins are separated by passing a liquid, preferably an aqueous solution such as a sodium chloride brine, upward through said bed at a rate at least sufficient to cause separation of the mixed exchange resins into two layers each of a different exchange resin. Thereafter, the separate layers of the bed are treated respectively for removal of adsorbed ions and for regeneration of the exchange resins and then the exchange resins are re-mixed, e.g. by air blowing under water. This type of separation treatment of mixed exchange resins is practiced with certain prior art processes.

Cation and ion exchange resins useful for this invention may be of either the gel-type or the macroreticular type. Ion exchange resins of various types are discussed, for example, in the Kirk-Othmer Encyclopedia of Chemical Technology, Second Edition, Volume II pages 871 et seq. The principal requirement of the ion exchange resins of this invention, other than that one be an anion exchanger and the other be a cation exchanger, is that said materials have a specific gravity difference, said difference being no greater than about 0.2.

In a preferred embodiment of the present invention the mixed ion exchange resin bed is used in a process for removing chromate ions from a chlorate rich-chloride solution obtained from the electrolysis of an alkali metal chloride as disclosed in co-pending application Ser. No. 832,866, filed Sept. 13, 1977. In this co-pending application, a chlorate rich-chloride solution containing chromate ions is passed through a bed of mixed ion exchange resins to remove the chromate ions. The exchange resins consist of an anion exchange resin initially in the chloride form and a weak cation exchange resin initially in the hydrogen form but conditioned by displacement of some of the hydrogen ions with alkali metal ions, preferably sodium ions. After exhaustion of the bed, an alkaline solution, e.g. about 4% sodium hydroxide dissolved in 8–12% sodium chloride brine, is passed through the bed to remove chromate ions and convert the anion exchange resin into the hydroxide form. Thereafter, the bed is regenerated by passing a mineral acid solution, e.g. 4% hydrochloric acid in 8-12% sodium chloride brine, therethrough. During the ion exchange process the bed may be drained and backwashed with a neutral brine solution, e.g. 12% sodium chloride.

The process of this invention, in general, can be employed when one or more of the following conditions are present:

(1) The specific gravity of the feed solution exceeds the specific gravities of the resins and the resin bed is free to move upward en masse in the column.

(2) The specific gravities of the exchange resins exceed somewhat that of the feed solution and the upward velocity of the solution is sufficient to cause the resins to move upward en masse in the column.

(3) The specific gravities and solution flow velocity are within certain limits (such that the bed tends to rise) and the resin bed is restrained from rising by some physical means, such as an adjustable solution outlet at the level of the bed surface, an expandable air bag or weighted piston.

Under conditions wherein the bed rises initially with the upflowing feed solution, such as in (1) and (2) above, the mixed resin bed is kept from floating out of the column by means of some suitable restraining device, such as a screen or floating beads.

From the above it can be seen that the flow rate of the solutions passed through the bed of exchange resins is pertinent only in that it is a problem when such solution has a higher specific gravity than the exchange resins and the flow of the solution through the bed is downward, ie, where the downward force of flow is insufficient to overcome the buoyancy of the exchange resins in a more dense feed liquor.

This invention is particularly advantageous when incorporated in processes (e.g. electrolytic preparation of chlorates) having the following characteristics:

(1) The solutions to be treated have a high specific gravity, particularly 1.20 or greater.

(2) The ion component to be removed has a slow exchange rate requiring a low flow velocity (e.g. less than 1 gallon per minute per square foot of cross-section of bed).

(3) The ion concentration to be removed from the solution being treated is high, requiring frequent exchange resin regeneration.

(4) The solution to be treated has a low solids content, requiring only infrequent backwashing of the exchange resin bed.

(5) Dilution of the process liquor by recycling of the regenerant solutions is detrimental.

(6) The recycling of the solutes of the process solutions is advantageous.

FIG. 1 of the attached drawings is a flow diagram of the preferred embodiment of this invention. The diagram depicts two columns for operating alternate cycles of the process. Assuming that the process has been in operation, a feed solution containing ions to be removed in accordance with this invention obtained from a process designated as 1 (such as that disclosed in U.S. Pat. No. 3,835,011 issued Oct. 10, 1974) is then passed to either column 6 or column 10 depending on which has its mixed anion-cation exchange resin bed ready to receive the feed solution. As shown in the drawing, the feed solution is passed to column 6 containing mixed resin bed 8 which is in the regenerated and, if necessary, conditioned state. The resin bed is capable of moving up or down in the column and, as the feed solution is passed into the column, the bed 8 rises to the top and is restrained at the top by some means such as a screen or layer of polyethylene beads (not shown). Refined product is collected or piped off at the top of the column, as generally shown.

When the bed is exhausted, the unrefined feed solution may be channeled to the spent product zone 10 and then the flow of the feed solution is terminated. As shown in column 12, the adsorbed ions removed by the bed are replaced from the exhausted bed by passing an appropriate aqueous solution (e.g. anionic regenerant) having ability to accept said ions from the exchange resin in bed 14, through line 16 downward through bed 14 thereby pushing the bed down in column 12. Flow of the regenerant is continued until all or substantially all of the ion is stripped from the bed. Thereafter, the bed is treated by passage of a second aqueous solution (regenerant) having the ability to regenerate the exchange resins. The flow of this regenerating solution is preferably downward (as shown) through the bed as are subsequent rinse solutions 26 used to condition the resins. Spent regenerants 18 and rinses are sent to waste or, preferably, to the process zone where they are mixed with a process liquor stream and thereby effectively recycled. The valves of the diagram, as shown in FIG. 1, are set to return all regenerants and rinse flows to the process. When the bed in column 12 is ready, the feed solution is switched from column 6 to column 12 and the process is repeated.

Figure 2:
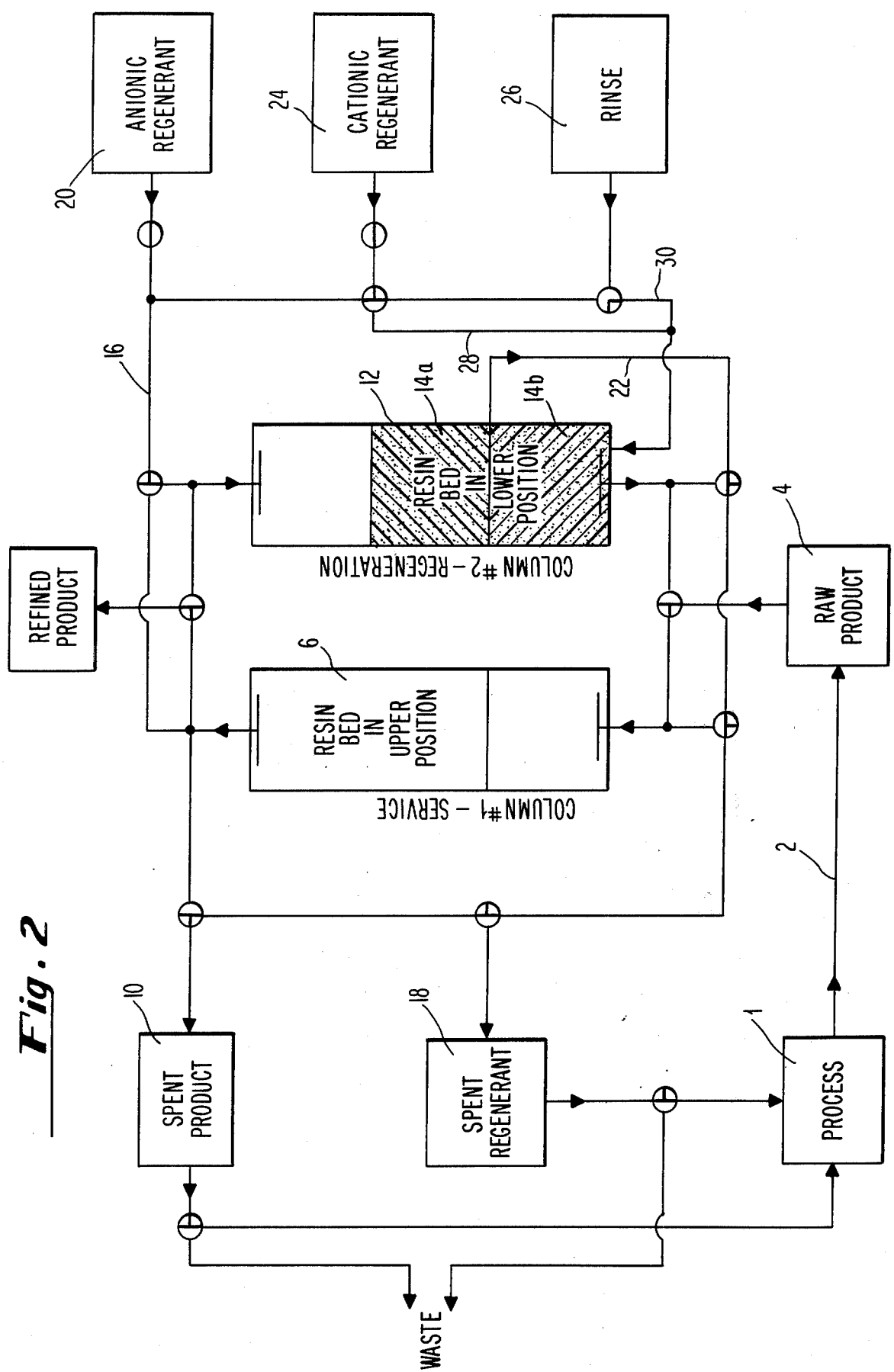

FIG. 2 of the attached drawing is a flow diagram of modifications of the regeneration phase of the present invention. In the embodiment shown, the exchange resins of column 12 have been exhausted and are caused to separate after termination of the feed solution by backwashing the bed through line 30 at a flow rate sufficient to stratify the resins into an upper layer 14a of one of the exchange resins and a lower layer 14b of the other. In the drawing, which shows regenerant flows for column 12, the anion exchange layer is shown as the upper layer 14a while the lower layer 14b is the cation exchange layer. This need not be the case however since, alternatively, the anion resin could be heavier than the cation resin depending on the material selected. In this modification, the anion resin is regenerated by down flow treatment with an alkaline solution (anion regenerant) 20 and additional piping is added at 22 to permit the regenerant liquid to be withdrawn after passing downward through the anion exchange resin layer only. This step is followed by passing the acid regenerant (cationic regenerant) 24 through both layers of resins. As in the embodiment shown in FIG. 1, the valves are set to return all regenerant and rinse solutions to process 1.

Alternatively, lines 28 and 30 define piping and valving which allow separate regeneration of the anion resin by downward flow of the alkaline solution 20 and regeneration of the cation resin by upward flow of the acid solution 24 which may be accomplished sequentially or simultaneously. Both alkaline and acid regenerant liquid are withdrawn through line 22. The regenerating schemes shown in FIG. 2 are well known in this art.

The following example is set forth to specifically describe the operation of the process of this invention.

EXAMPLE

Equal parts by weight of a strong anion exchange resin of the gel-type (Amberlite IRA 400, disclosed by the manufacturer, Rohm and Haas Company, to have a specific gravity of 1.11) and a weak acid exchange resin of the gel-type (Amberlite IRC 84, disclosed by the manufacturer, Rohm and Haas Company, to have a specific gravity of 1.19) were intimately mixed in a 10 inch diameter column especially piped for cycling a continuous ion exchange process. Mixing was carried out by air blowing under water.

After conditioning the bed to provide an appropriate resin mixture, each resin having the proper form, a chlorate rich-chloride solution containing chromate ions and having a specific gravity of 1.4 was passed upward through the bed at a flow rate of 0.5 gallons per minute (g.p.m.) per square foot of bed cross section. As the solution was fed in an upward direction through the bed the resin beads freely rose en masse to the top of the column with the denser liquid. When the bed was exhausted, the adsorbed chromate ions were removed from the bed by passing a solution of 4% sodium hydroxide dissolved in 8% sodium chloride brine downward through the bed. After this stripping operation the mixed resin bed was treated by the downflow passage of an aqueous solution of 4% hydrochloric acid in about 8% sodium chloride brine to regenerate the bed. Thereafter, the bed was rinsed with a sodium chloride brine having a specific gravity of about 1.1. In each of the stripping, regenerating, conditioning and rinse steps the solutions were made to flow downward through the resin bed so that the resin beads sank freely en masse in the solution.

The equipment for upflow passage of fluid through the resin bed utilized a screen to prevent the resin beads from flowing out of the top of the column.

The above described method differs from the common practice in that the service step is upflow, the resins are not separated for regeneration and the bed moves up and down en masse. The following advantages over common practice results from this new method:

(1) The amount of piping is reduced.
(2) The number of operating steps is reduced.
(3) Safer conditions are employed regarding the highly acidified feed solution.
(4) The number of rinses and backwashes is reduced and dilution of process liquor with water is lessened.
(5) There is a reduction of physical attrition and deterioration of the ion exchange resin ordinarily resulting from air agitation on remixing and from large variations in feed and process solution concentrations.

While the above advantages make the described method a desirable improvement over the usual procedure, the method may also be advantageously modified in accordance with known regenerating procedures to reduce the amount of regenerant solution used. This involves the separating of the resins subsequent to the upward flow service step in accordance with the following preferred modified procedure: The feed solution of a chlorate rich-chloride solution containing chromate ions is terminated after exhaustion of the bed. The bed is permitted to drain and after backwashing (e.g. with a 12% sodium chloride brine) wherein the brine is passed upward through the bed at a rate sufficient to separate the resins into upper and lower layers, each layer being a separate exchange resin. Thereafter, the anion exchange resin layer is treated by a downflow passage of 4% sodium hydroxide dissolved in 8–12% sodium chloride brine to remove adsorbed chromate ions. After terminating this downward flow, the heavier lower layer consisting of the cation exchange resin, is treated by the upward passage of 4% hydrochloric acid dissolved in 8–12% sodium chloride brine. This acidic solution is removed from the exchange column before passage through the lighter upper layer of anion exchange resin or it may continue its upward passage through the lighter anion exchange resin layer at the top of the column. Thereafter, the column is rinsed (e.g. with 12% sodium chlorine brine) to place the resins in proper form for the next treatment cycle.

While this regenerating modification does not have all the of advantages of the procedure in which the resins are not separated, there is a desirable reduction in the amount of regenerant solution used because, when the resins are not separated, some of the first regenerant caustic is wasted by neutralizing the cation resin. This must then be converted back to the acidic form which constitutes, in turn, a waste of regenerant acid.

In some cases exchange resins may be selected which are less dense than one or more of the downflow solutions used for treating. The process herein defined is still operable if the velocity of downward flow is sufficient to overcome the tendency of the resins to float. Conversely, a feed solution could be used even though its specific gravity was somewhat less than either (or both) of the resins provided that the upward velocity of flow sufficient to overcome the tendency of the resin to sink.

What is claimed:

1. In a cyclic method for the removal of ions from an aqueous feed solution by passing said feed solution through a column containing a bed of mixed anion and cation exchange resins having a specific gravity difference, said difference being no more than about 0.2, said bed being capable of moving upward or downward en masse in said column, and thereafter removing said ions from said bed and regenerating said exchange resins, the improvement which comprises the steps of:

(a) passing said feed solution upward through said bed at a rate sufficient to move said bed upward en masse whereby ions are removed from said feed solution by adsorption on at least one of said exchange resins;

(b) after terminating the flow of said feed solution through said bed, passing an ion accepting aqueous solution through said bed whereby said ions are at least substantially removed from said bed;

(c) after terminating the flow of said ion accepting aqueous solution, passing an aqueous regenerating solution through said bed for regenerating the exchange resin which adsorbed said ions; and (d) after terminating the flow of the regenerating aqueous solution, repeating said steps.

2. The method of claim 1 wherein said ion accepting aqueous solution is an alkaline solution.

3. The method of claim 2 wherein the aqueous regenerating solution is a mineral acid solution.

4. The method of claim 1 wherein the specific gravity of said feed solution exceeds the specific gravities of said exchange resins.

5. The method of claim 1 wherein the specific gravities of said exchange resins exceed the specific gravity of said feed solution in an amount no greater than can be overcome by the upward velocity of said feed solution.

6. The method of claim 1 wherein, after step (a) and before step (b), an aqueous solution is passed upward through said bed at a rate at least sufficient to stratify said exchange resins into an upper layer of one of said resins and a lower layer of the other of said resins, and, in step (b), said ion accepting solution is passed only through the exchange resin layer containing said ions.

7. The method of claim 1 wherein said feed solution is an alkali metal chlorate rich solution containing chromate ions, said anion exchange resin is in the chloride form and said cation exchange resin is a weak cation resin in a conditioned hydrogen form.

8. The method of claim 7 wherein said ion accepting solution is an alkaline solution and said regenerating solution is a mineral acid solution.

9. The method of claim 7 wherein said alkali metal chlorate rich solution is a sodium chlorate solution.

10. The method of claim 9 wherein said ion accepting solution is an alkaline solution of sodium chloride and said regenerating solution is an acid solution of sodium chloride.

* * * * *